United States Patent [19]

Wolfrum et al.

[11] 4,218,373
[45] Aug. 19, 1980

[54] WATER-SOLUBLE PHENYLAZOAMINONAPHTHOL SULPHONIC ACID DYESTUFFS

[75] Inventors: Gerhard Wolfrum, Leverkusen; Erich Klauke, Odenthal; Hans-Günter Otten, Leverkusen, all of Fed. Rep. of Germany

[73] Assignee: Bayer Aktiengesellschaft, Leverkusen, Fed. Rep. of Germany

[21] Appl. No.: 917,572

[22] Filed: Jun. 21, 1978

[30] Foreign Application Priority Data

Jun. 22, 1977 [DE] Fed. Rep. of Germany ....... 2728073

[51] Int. Cl.² .................... C09B 29/30; D06P 1/06; D06P 1/39; D06P 3/24
[52] U.S. Cl. .................................. 260/198; 260/509; 260/571; 260/573; 260/575
[58] Field of Search ........................................ 260/198

[56] References Cited

U.S. PATENT DOCUMENTS 2,194,927  3/1940  Daudt et al. .......................... 260/198
2,505,533  4/1950  Felix et al. ............................ 260/196

FOREIGN PATENT DOCUMENTS 2130027  12/1972  Fed. Rep. of Germany ........... 260/198
1229356   4/1971  United Kingdom .................... 260/198
1373928  11/1974  United Kingdom .................... 260/198

*Primary Examiner*—Floyd D. Higel
*Attorney, Agent, or Firm*—Sprung, Felfe, Horn, Lynch & Kramer

[57] ABSTRACT

A water-soluble monoazo dyestuff which, in the form of the free acid, corresponds to the formula

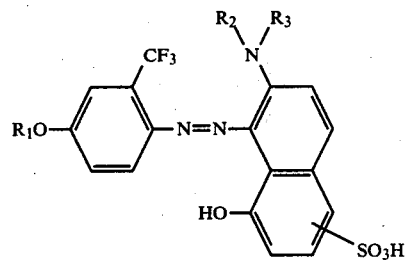

wherein $R_1$ denotes alkyl which can be mono-substituted by chlorine, hydroxyl, $C_1$ to $C_4$ alkoxy, cyano, phenyl or tolyl, cyclohexyl which can be optionally substituted by $C_1$–$C_4$ alkyl, phenyl, $C_1$–$C_4$-alkyl phenyl, chlorophenyl, bromophenyl, trifluoromethylphenyl or naphthyl, alkenyl or benzenesulphonyl which can be substituted by fluorine, chlorine, bromine, trifluoromethyl, $C_1$–$C_4$-alkyl or $C_1$–$C_4$-alkoxy, $R_2$ denotes hydrogen, $C_1$–$C_4$-alkyl which can be substituted by hydroxyl, cyano, formylamino, $C_1$–$C_4$ alkylcarbonylamino or benzoylamino which in turn can be substituted by methyl, chlorine, bromine or trifluoromethyl; cyclohexyl or phenyl which can be substituted by $C_1$–$C_4$ alkyl, $C_1$–$C_4$-alkoxy, chlorine, bromine or trifluoromethyl and $R_3$ denotes hydrogen or $C_1$–$C_4$-alkyl and a process for the preparation of such water-soluble mono-azo dyestuff. The dyestuffs according to the invention are suitable for dyeing natural and synthetic fibre materials, for example for dyeing wool or polyamide fibres, in level, deep red to violet shades with very good fastness to light, wet processing and perspiration.

4 Claims, No Drawings

WATER-SOLUBLE PHENYLAZOAMINONAPHTHOL SULPHONIC ACID DYESTUFFS

The invention relates to water-soluble monoazo dyestuffs which, in the form of the free acid, correspond to the formula

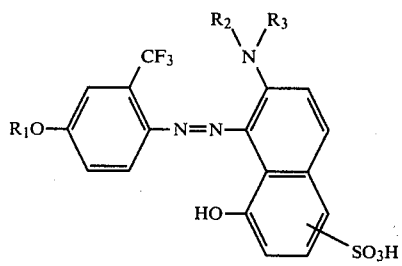

wherein
$R_1$ denotes optionally substituted alkyl, optionally substituted cyclohexyl, optionally substituted phenyl or naphthyl, alkenyl or optionally substituted benzenesulphonyl,
$R_2$ denotes hydrogen, optionally substituted $C_1$–$C_4$-alkyl, cyclohexyl or optionally substituted phenyl and
$R_3$ denotes hydrogen or $C_1$–$C_4$-alkyl.

The sulphonic acid group is preferably in the m-position or p-position relative to the hydroxyl group.

Suitable substituents $R_1$ are $C_1$–$C_8$-alkyl which is optionally monosubstituted by chlorine, hydroxyl, $C_1$–$C_4$-alkoxy, cyano, phenyl or tolyl, $C_2$–$C_4$-alkenyl, cyclohexyl, $C_1$–$C_4$-alkylcyclohexyl, phenyl, $C_1$–$C_4$-alkylphenyl, chlorophenyl, bromophenyl, trifluoromethylphenyl, naphthyl, trifluoromethylphenyl, naphthyl, trifluoromethyl and benzenesulphonyl which is optionally substituted by fluorine, chlorine, bromine, trifluoromethyl, $C_1$–$C_4$-alkyl or $C_1$–$C_4$-alkoxy.

Possible substituents of the alkyl radicals $R_2$ are, in particular, hydroxyl, cyano, formylamino, $C_1$–$C_4$-alkylcarbonylamino or benzoylamino which is optionally substituted by methyl, chlorine, bromine or trifluoromethyl. Possible substituents of the phenyl radicals $R_2$ are $C_1$–$C_4$-alkyl, $C_1$–$C_4$-alkoxy, chlorine, bromine and trifluoromethyl.

Particularly suitable dyestuffs correspond, in the form of the free acid, to the formula

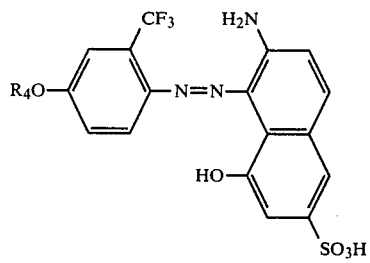

wherein $R_4$ denotes $C_1$–$C_4$-alkyl, hydroxyethyl, hydroxypropyl, hydroxybutyl, cyanoethyl or phenyl which is optionally substituted by chlorine or methyl.

The dyestuffs of the formula (I) are prepared either by diazotising amines of the formula

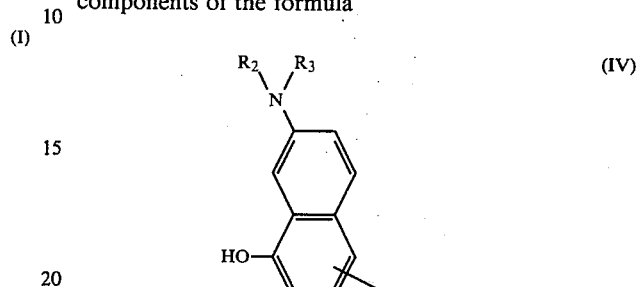

and coupling the diazotisation products with coupling components of the formula

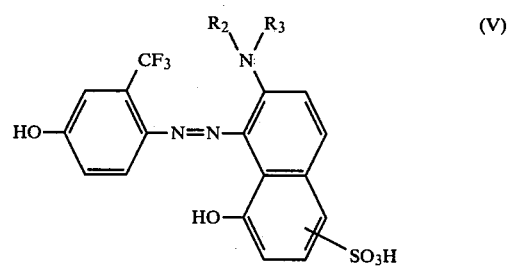

wherein $R_1$, $R_2$ and $R_3$ have the abovementioned meaning.

If $R_1$ denotes an optionally substituted alkyl group, an alkenyl group or an optionally substituted benzenesulphonyl radical, the dyestuffs of the formula (I) can also be prepared by alkylating, alkenylating or acylating, with optionally substituted benzenesulphonyl chlorides, hydroxyazo dyestuffs of the formula (V)

wherein $R_2$ and $R_3$ have the abovementioned meaning, the radical $R_1$ being introduced.

Examples of suitable alkylating agents are $C_1$–$C_4$-alkyl halides, $C_1$–$C_4$-dialkyl sulphates, alkylene oxides with 2 to 4 C atoms and acrylonitrile.

Suitable acylating agents are benzenesulphonic acid halides which are optionally substituted by fluorine, chlorine, bromine, methyl, ethyl or trifluoromethyl.

The dyestuffs according to the invention are suitable for dyeing natural and synthetic fibre materials, for example for dyeing wool or polyamide fibres, in level, deep red to violet shades with very good fastness to light, wet processing and perspiration. Depending on the substituents $R_1$, $R_2$ or $R_3$, they can be particularly suitable for dyeing polyamide fibres. For example, it is possible to prepare dyestuffs which are absorbed well onto polyamide fibres even from a neutral to weakly acid dyebath, but also to prepare those which are taken up quantitatively by the fibre only from a weakly to more strongly acid dyebath. In the same manner, their ease of combination with yellow and blue acid dyestuffs can be advantageously influenced. Polyamide fibres are understood, in particular, as those consisting of synthetic polyamides, such as ε-polycaprolactam or condensation products of adipic acid and hexamethylenediamine.

EXAMPLE 1

19.1 g of 2-amino-5-methoxy-benzotrifluoride are dissolved in 350 ml of water and 30 ml of concentrated hydrochloric acid, the solution is cooled to 0° C. and the amine is diazotised with a solution of 6.9 g of sodium nitrite in 50 ml of water. After destroying excess nitrous acid with amidosulphonic acid, the diazonium salt solution is added to a solution, cooled to 5° C., of 24.2 g of 6-amino-4-hydroxynaphthalene-2-sulphonic acid in 300 ml of dimethylformamide. The coupling is rapidly completed in the strongly acid medium. The mixture is subsequently stirred at room temperature for 2 hours. The reaction product is then filtered off and dried. 38 g of a red powder of the formula

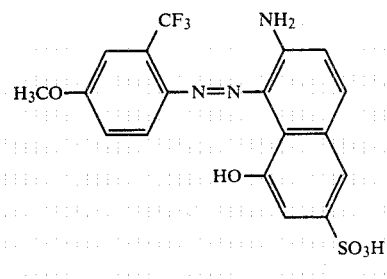

which dyes polyamide fibres and wool in a clear red from an aqueous solution, are obtained.

EXAMPLE 2

43 g of the dyestuff of the formula

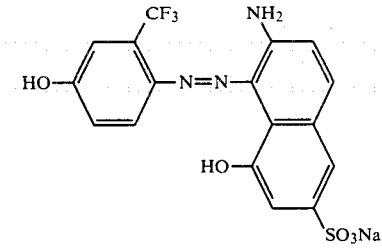

obtained by coupling diazotised 2-amino-5-hydroxybenzotrifluoride with 6-amino-4-hydroxynaphthalene-2-sulphonic acid, are dissolved in a mixture of 250 ml of water, 250 ml of isopropanol and 40 ml of 10% strength sodium hydroxide solution, and 10 g of propylene oxide are added in the course of 2 hours, whilst stirring. The temperature is kept at 50° C. during the addition of the propylene oxide. When the reaction has ended, which can be established by thin layer chromatography, 500 ml of water and then 70 g of sodium chloride are added, the mixture is cooled to room temperature, whilst stirring, and the dyestuff is filtered off. It has the formula

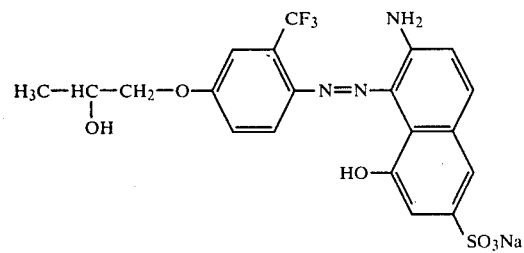

and dyes polyamide fibres in a clear red from an aqueous solution.

EXAMPLE 3

43 g of the dyestuff of the formula are dissolved in 800 ml of water and 40 ml of 10% strength sodium hydroxide solution. 23 g of benzenesulphonyl chloride are added dropwise at room temperature in the course of 2 hours, whilst stirring thoroughly. The pH is kept at 8–9, if necessary by further addition of 10% strength sodium hydroxide solution. When the starting dyestuff can no longer be seen in the thin layer chromatogram, 80 g of sodium chloride are added, the mixture is further stirred for some time and the reaction product is then filtered off. After drying, 51 g of a red dyestuff of the formula which dyes polyamide fibres in a clear red, are obtained.

EXAMPLE 4

0.1 g of the dyestuff obtained according to Example 1 are dissolved in 100 ml of hot water. 5 ml of ammonium acetate solution are added and the mixture is diluted with cold water to a volume of 500 ml. 10 g of polyamide fibre material are introduced into this dyebath, the dyebath is heated to the boil in the course of 20 minutes, 4 ml of 10% strength acetic acid are added and the bath is kept at the boiling point for 1 hour. Thereafter, the dyed polyamide is removed from the dyebath, rinsed thoroughly with hot water and dried at 70°–80° C. A clear red dyeing is obtained.

If the diazo and coupling components listed in Table 1 are used, further valuable water-soluble dyestuffs which dye polyamide in red shades from a weakly acid or neutral bath are obtained by the process indicated in Example 1:

Table 1

| Example | Diazo component | Coupling component |
|---|---|---|
| 5 | 2-Amino-5-ethoxy-benzotrifluoride | 2-Amino-8-hydroxy-naphthalene-6-sulphonic acid |
| 6 | 2-Amino-5-propoxybenzotrifluoride | 2-Amino-8-hydroxy-naphthalene-6-sulphonic acid |
| 7 | 2-Amino-5-isopropoxy-benzotrifluoride | 2-Amino-8-hydroxy-naphthalene-6-sulphonic acid |
| 8 | 2-Amino-5-butoxy-benzotrifluoride | 2-Amino-8-hydroxy-naphthalene-6-sulphonic acid |
| 9 | 2-Amino-5-(2-methylpropyl)-oxy-benzotrifluoride | 2-Amino-8-hydroxy-naphthalene-6-sulphonic acid |
| 10 | 2-Amino-5-(1-methylpropyl)-oxy-benzotrifluoride | 2-Amino-8-hydroxy-naphthalene-6-sulphonic acid |
| 11 | 2-Amino-5-tert.-butoxy-benzotrifluoride | 2-Amino-8-hydroxy-naphthalene-6-sulphonic acid |
| 12 | 2-Amino-5-pentyloxy-benzotrifluoride | 2-Amino-8-hydroxy-naphthalene-6-sulphonic acid |
| 13 | 2-Amino-5-(3-methyl-butyl)-oxy-benzotrifluoride | 2-Amino-8-hydroxy-naphthalene-6-sulphonic acid |
| 14 | 2-Amino-5-allyloxy-benzotrifluoride | 2-Amino-8-hydroxy-naphthalene-6-sulphonic acid |
| 15 | 2-Amino-5-crotyloxy-benzotrifluoride | 2-Amino-8-hydroxy-naphthalene-6-sulphonic acid |
| 16 | 2-Amino-5-methallyloxy-benzotrifluoride | 2-Amino-8-hydroxy-naphthalene-6-sulphonic acid |
| 17 | 2-Amino-5-(2-chloroethyl)-oxy-benzotrifluoride | 2-Amino-8-hydroxy-naphthalene-6-sulphonic acid |
| 18 | 2-Amino-5-(2-methoxyethyl)-oxy-benzotrifluoride | 2-Amino-8-hydroxy-naphthalene-6-sulphonic acid |
| 19 | 2-Amino-5-(2-butoxyethyl)-oxy-benzotrifluoride | 2-Amino-8-hydroxy-naphthalene-6-sulphonic acid |
| 20 | 2-Amino-5-(2-cyanoethyl)-oxy-benzotrifluoride | 2-Amino-8-hydroxy-naphthalene-6-sulphonic acid |
| 21 | 2-Amino-5-(4-cyanobutyl)-oxy-benzotrifluoride | 2-Amino-8-hydroxy-naphthalene-6-sulphonic acid |
| 22 | 2-Amino-5-trifluoromethoxy-benzotrifluoride | 2-Amino-8-hydroxy-naphthalene-6-sulphonic acid |
| 23 | 2-Amino-5-(2-hydroxyethyl)-oxy-benzotrifluoride | 2-Amino-8-hydroxy-naphthalene-6-sulphonic-acid |
| 24 | 2-Amino-5-(2-hydroxybutyl)oxy-benzotrifluoride | 2-Amino-8-hydroxy-naphthalene-6-sulphonic acid |
| 25 | 2-Amino-5-(2-methyl-2-hydroxypropyl)-oxy-benzotrifluoride | 2-Amino-8-hydroxy-naphthalene-6-sulphonic acid |
| 26 | 2-Amino-5-(2-phenylethyl)-oxy-benzotrifluoride | 2-Amino-8-hydroxy-naphthalene-6-sulphonic acid |
| 27 | 2-Amino-5-cyclohexyloxy-benzotrifluoride | 2-Amino-8-hydroxy-naphthalene-6-sulphonic acid |
| 28 | 2-Amino-5-(4-methylcyclohexyl)-oxy-benzotrifluoride | 2-Amino-8-hydroxy-naphthalene6-sulphonic acid |
| 29 | 2-Amino-5-phenoxy-benzotrifluoride | 2-Amino-8-hydroxy-naphthalene-6-sulphonic acid |
| 30 | 2-Amino-5-(4-methylphenyl)-oxy-benzotrifluoride | 2-Amino-8-hydroxy-naphthalene-6-sulphonic acid |
| 31 | 2-Amino-5-(2-methylphenyl)-oxy-benzotrifluoride | 2-Amino-8-hydroxy-naphthalene-6-sulphonic acid |

Table 1-continued

| Example | Diazo component | Coupling component |
|---|---|---|
| 32 | 2-Amino-5-(4-chlorophenyl)-oxy-benzotrifluoride | 2-Amino-8-hydroxy-naphthalene-6-sulphonic acid |
| 33 | 2-Amino-5-(3-chlorophenyl)-oxy-benzotrifluoride | 2-Amino-8-hydroxy-naphthalene6-sulphonic acid |
| 34 | 2-Amino-5-(2-chlorophenyl)-oxy-benzotrifluoride | 2-Amino-8-hydroxy-naphthalene-6-sulphonic acid |
| 35 | 2-Amino-5-(3-bromophenyl)-oxy-benzotrifluoride | 2-Amino8-hydroxy-naphthalene-6-sulphonic acid |
| 36 | 2-Amino-5-(3-trifluoromethyl-phenyl)-oxy-benzotrifluoride | 2-Amino-8-hydroxy-npahthalene-6-sulphonic acid |
| 37 | 2-Amino-5-methoxy-benzotrifluoride | 2-Amino-8-hydroxy-naphthalene-5-sulphonic acid |
| 38 | 2-Amino-5-ethoxy-benzotrifluoride | 2-Amino-8-hydroxy-naphthalene-5-sulphonic acid |
| 39 | 2-Amino-5-butoxy-benzotrifluoride | 2-Amino-8-hydroxy-naphthalene-5-sulphonic acid |
| 40 | 2-Amino-5-(2-methoxyethyl)-oxy-benzotrifluoride | 2-Amino-8-hydroxy-naphthalene-5-sulphonic acid |
| 41 | 2-Amino-5-(2-hydroxyethyl)-oxy-benzotrifluoride | 2-Amino-8-hydroxy-naphthalene-5-sulphonic acid |
| 42 | 2-Amino-5-(2-cyanoethyl)-oxy-benzotrifluoride | 2-Amino-8-hydroxy-naphthalene-5-sulphonic acid |
| 43 | 2-Amino-5-trifluoromethoxy-benzotrifluoride | 2-Amino-8-hydroxy-naphthalene-5-sulphonic acid |
| 44 | 2-Amino-5-(2-phenylethyl)-oxy-benzotrifluoride | 2-Amino-8-hydroxy-naphthalene-5-sulphonic acid |
| 45 | 2-Amino-5-phenoxy-benzotrifluoride | 2-Amino-8-hydroxy-naphthalene-5-sulphonic acid |
| 46 | 2-Amino-5-(4-chlorophenyl)-oxy-benzotrifluoride | 2-Amino-8-hydroxy-naphthalene-5-sulphonic acid |
| 47 | 2-Amino-5-(3-trifluoromethyl-phenyl)-oxy-benzotrifluoride | 2-Amino-8-hydroxy-naphthalene-5-sulphonic acid |
| 48 | 2-Amino-5-methoxy-benzotrifluoride | 2-Methylamino-8-hydroxynaphthalene-6-sulphonic acid |
| 49 | 2-Amino-5-isopropoxy-benzotrifluoride | 2-Methylamino-8-hydroxynaphthalene-6-sulphonic acid |
| 50 | 2-Amino-5-butoxy-benzotrifluoride | 2-Methylamino-8-hydroxynaphthalene-6-sulphonic acid |
| 51 | 2-Amino-5-phenoxy-benzotrifluoride | 2-Methylamino-8-hydroxynaphthalene-6-sulphonic acid |
| 52 | 2-Amino-5-(4-chlorophenyl)-oxy-benzotrifluoride | 2-Methylamino-8-hydroxynaphthalene-6-sulfonic acid |
| 53 | 2-Amino-5-methoxy-benzotrifluoride | 2-Dimethylamino-8-hydroxy-naphthalene-6-sulphonic acid |
| 54 | 2-Amino-5-phenoxy-benzotrifluoride | 6-Dimethylamino-8-hydroxy-naphthalene-6-sulphonic acid |
| 55 | 2-Amino-5-isopropoxy-benzotrifluoride | 2-Phenylamino-8-hydroxy-naphthalene-6-sulphonic acid |
| 56 | 2-Amino-5-phenoxy-benzotrifluoride | 2-Phenylamino-8-hydroxy-naphthalene-6-sulphonic acid |
| 57 | 2-Amino-5-cyclohexyloxy-benzotrifluoride | 2-Phenylamino-8-hydroxy-naphthalene-6-sulfonic acid |
| 58 | 2-Amino-5-methoxy-benzotrifluoride | 2-β-Hydroxyethyl-amino-8-hydroxy-naphthalene-6- |

Table 1-continued

| Example | Diazo component | Coupling component |
|---|---|---|
| 59 | 2-Amino-5-phenoxy-benzotrifluoride | 2-β-Hydroxyethyl-amino-8-hydroxy-naphthalene-6-sulfonic acid |
| 60 | 2-Amino-5-methoxy-benzotrifluoride | 2-Butylamino-8-hydroxy-naphthalene-6-sulphonic acid |
| 61 | 2-Amino-5-butoxy-benzotrifluoride | 2-Butylamino-8-hydroxy-naphthalene-6-sulphonic acid |
| 62 | 2-Amino-5-phenoxy-benzotrifluoride | 2-Butylamino-8-hydroxy-naphthalene-6-sulphonic acid |
| 63 | 2-Amino-5-(4-chlorophenyl)-oxy-benzotrifluoride | 2-Butylamino-8-hydroxy-naphthalene-6-sulphonic acid |
| 64 | 2-Amino-5-methoxy-benzotrifluoride | 2-Cyclohexylamino-8-hydroxy-naphthalene-6-sulphonic acid |
| 65 | 2-Amino-5-phenoxy-benzotrifluoride | 2-Cyclohexylamino-8-hydroxy-naphthalene-6-sulphonic acid |
| 66 | 2-Amino-5-(4-chlorophenyl)-oxy-benzotrifluoride | 2-Cyclohexylamino-8-hydroxy-naphthalene-6-sulfonic acid |
| 67 | 2-Amino-5-methoxy-benzotrifluoride | 2-(2,4-Dimethyl-phenyl)-amino-8-hydroxy-nahthalene-6-sulphonic acid |
| 68 | 2-Amino-5-phenoxy-benzotrifluoride | 2-(2,4-Dimethyl-phenyl)-amino-8-hydroxy-naphthalene-6-sulphonic acid |
| 69 | 2-Amino-5-(2-hydroxyethyl)-oxy-benzotrifluoride | 2-(2,4-Dimethyl-phenyl)-amino-8-hydroxy-naphthalene-6-sulphonic acid |
| 70 | 2-Amino-5-(4-tert.-butyl-phenyl)-oxy-benzotrifluoride | 2-Amino-8-hydroxy-npahthalene-6-sulphonic acid |
| 71 | 2-Amino-5-(4-methylmercapto-phenyl)-oxy-benzotrifluoride | 2-Amino-8-hydroxy-naphthalene-6-sulphonic acid |
| 72 | 2-Amino-5-(1-naphthyloxy)-benzotrifluoride | 2-Amino-8-hydroxy-naphthalene-6-sulphonic acid |
| 73 | 2-Amino-5-(2-naphthyloxy)-benzotrifluoride | 2-Amino-8-hydroxy-naphthalene-6-sulphonic acid |

Table 2 gives further dyestuffs which dye polyamide in red shades and which have been obtained by alkylating or acylating the dyestuff of the formula

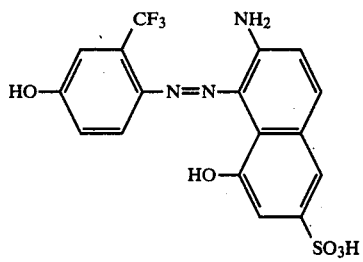

on the OH group of the benzene ring, using the alkylating or acylating agents indicated in the Table.

Table 2

| Example | Alkylating or acylating agent |
|---|---|
| 74 | Dimethyl sulphate |
| 75 | Diethyl sulphate |
| 76 | 4-Methylbenzenesulphonic acid methyl ester |
| 77 | Ethylene oxide |
| 78 | Propylene oxide |
| 79 | 1,2-Butylene oxide |
| 80 | Styrene oxide |
| 81 | 2-Chloroethanol |
| 82 | Benzyl chloride |
| 83 | Acrylonitrile |
| 84 | Phenethyl bromide |
| 85 | Allyl bromide |
| 86 | 4-Methyl-benzenesulphonyl chloride |
| 87 | 2-Methylbenzenesulphonyl chloride |
| 88 | 3-Methylbenzenesulphonyl chloride |
| 89 | 4-Ethylbenzenesulphonyl chloride |
| 90 | 4-Chlorobenzenesulphonyl chloride |
| 91 | 4-Bromobenzenesulphonyl chloride |
| 92 | 4-Fluorobenzenesulphonyl cholride |
| 93 | 3-Trifluoromethylbenzenesulphonyl chloride |
| 94 | 4-Methoxybenzenesulphonyl chloride |
| 95 | 2,4-Dichlorobenzenesulphonyl chloride |
| 96 | 4-Isopropylbenzenesulphonyl chloride |

Table 2-continued

| Example | Alkylating or acylating agent |
| --- | --- |
| 97 | 4-tert.-Butylbenzenesulphonyl chloride |
| 98 | 4-Butoxybenzenesulphonyl chloride |

We claim:

1. A water-soluble monoazo dyestuff which, in the form of the free acid, corresponds to the formula

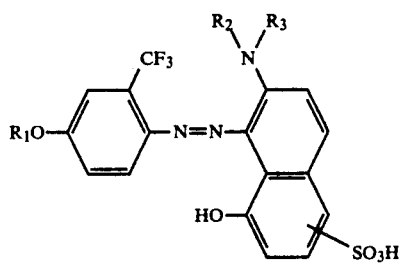

wherein
R$_1$ denotes alkyl alkyl mono-substituted by chlorine, hydroxyl, C$_1$ to C$_4$ alkoxy, cyano, phenyl or tolyl, cyclohexyl cyclohexyl substituted by C$_1$-C$_4$-alkyl, phenyl C$_1$-C$_4$-alkyl phenyl, chlorophenyl, bromophenyl, trifluoromethylphenyl or napthyl, alkenyl or benzenesulphonyl benzenesulphonyl substituted by fluorine, chlorine, bromine, trifluoromethyl, C$_1$-C$_4$-alkyl or C$_1$-C$_4$-alkoxy,
R$_2$ denotes hydrogen, C$_1$-C$_4$-alkyl C$_1$-C$_4$-alkyl substituted by hydroxyl, cyano, formylamino, C$_1$-C$_4$ alkylcarbonylamino or benzoylamino, C$_1$-C$_4$-alkyl- carbonylamino or benzoylamino; substituted by methyl, chlorine, bromine or trifluoromethyl; cyclohexyl or phenyl, cyclohexyl or phenyl substituted by C$_1$-C$_4$-alkyl, C$_1$-C$_4$-alkoxy, chlorine, bromine, or trifluoromethyl and
R$_3$ denotes hydrogen or C$_1$-C$_4$-alkyl.

2. An azo dyestuff according to claim 1, wherein the sulphonic acid group is in the m-position or p-position relative to the hydroxyl group.

3. An azo dyestuff according to claim 1, wherein
R$_1$ denotes C$_1$-C$_8$-alkyl, C$_1$-C$_8$-alkyl monosubstituted by chlorine, hydroxyl, C$_1$-C$_4$-alkoxy, cyano, phenyl or tolyl, C$_2$-C$_4$-alkenyl, cyclohexyl, C$_1$-C$_4$-alkylcyclohexyl, phenyl, C$_1$-C$_4$-alkylphenyl, chlorophenyl, bromophenyl, trifluoromethylphenyl, naphthyl, trifluoromethyl or benzenesulphonyl or benzenesulphonyl substituted by fluorine, chlorine, bromine, trifluoromethyl, C$_1$-C$_4$-alkyl or C$_1$-C$_4$-alkoxy,
R$_2$ denotes hydrogen or C$_1$-C$_4$-alkyl, C$_1$-C$_4$-alkyl substituted by hydroxyl, cyano, formylamino, C$_1$-C$_4$-alkylcarbonylamino or benzoylamino, C$_1$-C$_4$-alkylcarbonylamino or benzoylamine; substituted by methyl, chlorine, bromine or trifluoromethyl, or phenyl or phenyl substituted by C$_1$-C$_4$-alkyl, C$_1$-C$_4$-alkoxy, chlorine, bromine or trifluoromethyl and
R$_3$ denotes hydrogen or C$_1$-C$_4$-alkyl.

4. An azo dyestuff according to claim 1 which, in the form of the free acid, corresponds to the formula

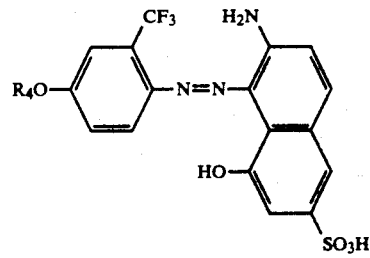

wherein R$_4$ denotes C$_1$-C$_4$-alkyl, hydroxyethyl, hydroxypropyl, hydroxybutyl, cyanoethyl or phenyl or phenyl substituted by chlorine or methyl.

* * * * *

UNITED STATES PATENT AND TRADEMARK OFFICE
CERTIFICATE OF CORRECTION

PATENT NO. : 4,218,373
DATED : August 19, 1980
INVENTOR(S) : GERHARD WOLFRUM, ERICH KLAUKE, and
HANS-GÜNTER OTTEN It is certified that error appears in the above—identified patent and that said Letters Patent is hereby corrected as shown below:

In claim 1, line 2 after the formula, after "alkyl" (first (occurrence) insert --,--
" " " line 4 after the formula, after "cyclohexyl" (first occurrence) insert --,--
" " " line 5 after the formula, after "phenyl" (first occurrence) insert --,--
" " " line 7 after the formula, after "benzenesulphonyl" (first occurrence) insert --,--

In the Specification, column 10, line 65, "cholride" should be --chloride--.

Signed and Sealed this

Third Day of February 1981

[SEAL]

Attest:

RENE D. TEGTMEYER

Attesting Officer

Acting Commissioner of Patents and Trademarks